United States Patent
Owatari et al.

Patent Number: 6,095,645
Date of Patent: *Aug. 1, 2000

[54] INK JET RECORDING METHOD

[75] Inventors: Akio Owatari; Hiroyuki Onishi; Junichi Iida, all of Suwa, Japan

[73] Assignee: Seiko Epson Corporation, Shinjuku-Ku, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/630,680

[22] Filed: Apr. 12, 1996

[30] Foreign Application Priority Data

Apr. 21, 1995 [JP] Japan .................................. 7-097168

[51] Int. Cl.$^7$ .............................. B41J 2/01; C09D 11/00
[52] U.S. Cl. ........................................ 347/105; 106/20 D
[58] Field of Search .................................. 347/100, 105; 106/20 D

[56] References Cited

U.S. PATENT DOCUMENTS

| | | | |
|---|---|---|---|
| 4,361,843 | 11/1982 | Cooke et al. .......................... | 347/100 |
| 4,440,827 | 4/1984 | Miyamoto et al. ....................... | 428/327 |
| 4,770,934 | 9/1988 | Yamasaki et al. ....................... | 428/331 |
| 5,160,535 | 11/1992 | Cooke et al. ............................ | 106/19 |
| 5,180,624 | 1/1993 | Kojima et al. ........................... | 428/211 |
| 5,302,249 | 4/1994 | Malhotra et al. ........................ | 162/135 |
| 5,397,386 | 3/1995 | Nakazawa et al. ..................... | 106/22 K |
| 5,431,720 | 7/1995 | Nagai et al. ............................ | 347/100 |
| 5,571,850 | 11/1996 | Ma et al. ................................. | 523/160 |
| 5,620,793 | 4/1997 | Suzuki et al. ........................... | 428/342 |

FOREIGN PATENT DOCUMENTS

| | | |
|---|---|---|
| 0529797 | 3/1993 | European Pat. Off. . |
| 0538988 | 4/1993 | European Pat. Off. . |
| 0591004 | 4/1994 | European Pat. Off. . |
| 0619349 | 10/1994 | European Pat. Off. . |
| 3248879 | 11/1991 | Japan . |
| 6206361 | 7/1994 | Japan . |

*Primary Examiner*—John Barlow
*Assistant Examiner*—An H. Do
*Attorney, Agent, or Firm*—Ladas & Parry

[57] ABSTRACT

An ink jet recording method which can realize a sharp image and ink dots having excellent circularity is disclosed. The ink jet recording method comprises the step of ejecting ink droplets of an ink composition onto a recording medium to form an ink image on the recording medium, the ink composition having a contact angle with a sized recording paper of 0°, as measured one sec after the initiation of contact of the ink composition with the sized recording paper, and containing not less than 60% by weight of water, the recording medium having an ink-repellent layer comprising a water-soluble silicone compound and/or a water-soluble fluorine compound.

21 Claims, 1 Drawing Sheet

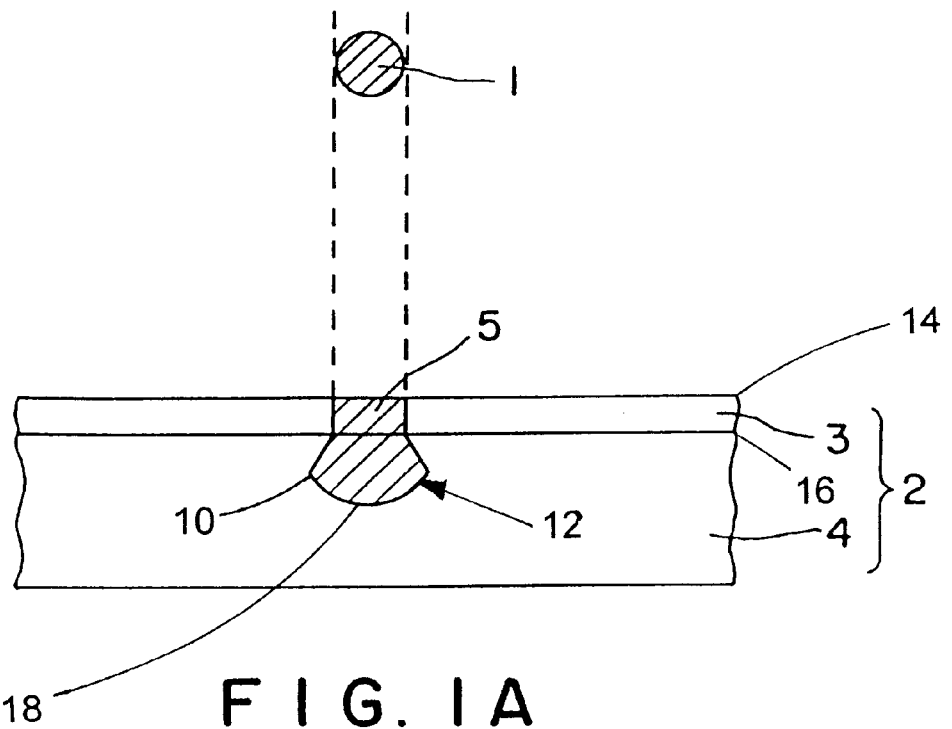
FIG. IA
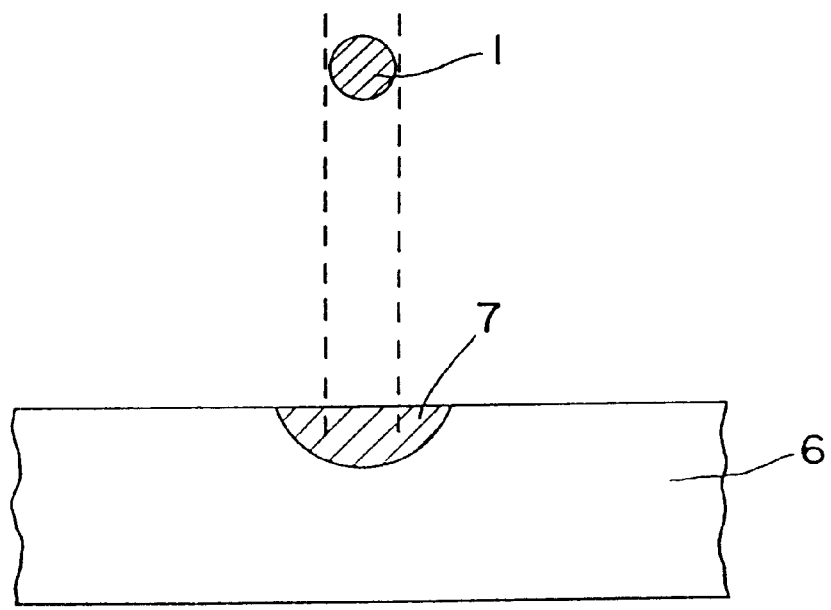
FIG. IB
PRIOR ART

INK JET RECORDING METHOD

BACKGROUND OF THE INVENTION

1. Field of the Invention

The present invention relates to an ink jet recording method.

2. Background Art

In recent years, recording mediums having a surface layer which is repellent to an ink composition have been proposed. When ink droplets are deposited onto such a recording medium by an ink jet recording method, the dots do not significantly spread on the recording medium, by virtue of the ink repellency of the recording medium (that is, by virtue of the ink-repellent layer which is less likely to be wetted with an ink), thereby forming relatively small ink dots. The small dots on the recording medium realize a sharp image.

SUMMARY OF THE INVENTION

We have now found that a combination of a recording medium comprising an ink-repellent layer as a surface layer with an ink composition having a specific property can realize a sharp image.

Accordingly, an object of the present invention is to provide an ink jet recording method which can provide a sharp image.

Another object of the present invention is to provide an ink jet recording method which can realize ink dots having excellent circularity.

The above objects of the present invention can be attained by an ink jet recording method comprising the step of ejecting ink droplets of an ink composition onto a recording medium to form an ink image on the recording medium, the ink composition having a contact angle with a sized recording paper of 0°, as measured one sec after the initiation of contact of the ink composition with the sized recording paper, and containing not less than 60% by weight of water, the recording medium having an ink-repellent layer comprising a water-soluble silicone compound and/or a water-soluble fluorine compound.

BRIEF DESCRIPTION OF THE DRAWING

FIG. 1 shows the formation of an ink dot on a recording medium, wherein FIG. 1A is a diagram showing the formation of an ink dot by the ink recording method of the present invention and FIG. 1B is a diagram showing the formation of an ink dot on a conventional recording medium not having any ink-repellent layer.

DETAILED DESCRIPTION OF THE INVENTION

The ink composition used in the present invention has a contact angle with a sized recording paper of 0°, as measured one sec after the initiation of contact of the ink composition with the sized recording paper, and contains not less than 60% by weight of water.

The term "sized recording paper" used herein refers to a recording paper generally called "plain paper" which has been treated for imparting resistance to ink or water penetration to the paper. The contact angle of the ink composition may be regulated by the components constituting the ink composition. In particular, they may be regulated by properly selecting the kind and amount of solvents, surfactants, and penetrating agents, described below, added to the ink composition.

The ink composition used in the present invention may basically comprise a colorant, an organic solvent, and water.

Preferred examples of the colorant usable in the ink composition include direct dyes, acid dyes, food dyes, basic dyes, reactive dyes, disperse dyes, vat dyes, soluble vat dyes, reactive disperse dyes, and oil dyes. Among others, water-soluble dyes are preferably used from the viewpoint of properties of the recording fluid, and particularly preferred water-soluble dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247;

C.I. Direct Violet 7, 9, 47, 48, 51, 66, 90, 93, 94, 95, 98, 100, and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397;

C.I. Acid Violet 5, 34, 43, 47, 48, 90, 103, and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227;

C.I. Acid Blue 9, 25, 40, 41, 62, 72, 76, 78, 80, 82, 92, 106, 112, 113, 120, 127: 1, 129, 138, 143, 175, 181, 205, 207, 220, 221, 230, 232, 247, 258, 260, 264, 271, 277, 278, 279, 280, 288, 290, and 326;

C.I. Acid Black 7, 24, 29, 48, 52: 1 and 172;

C.I. Reactive Red 3, 13, 17, 19, 21, 22, 23, 24, 29, 35, 37, 40, 41, 43, 45, 49, and 55;

C.I. Reactive Violet 1, 3, 4, 5, 6, 7, 8, 9, 16, 17, 22, 23, 24, 26, 27, 33, and 34;

C.I. Reactive Yellow 2, 3, 13, 14, 15, 17, 18, 23, 24, 25, 26, 27, 29, 35, 37, 41, and 42;

C.I. Reactive Blue 2, 3, 5, 8, 10, 13, 14, 15, 17, 18, 19, 21, 25, 26, 27, 28, 29, and 38;

C.I. Reactive Black 4, 5, 8, 14, 21, 23, 26, 31, 32, and 34;

C.I. Basic Red 12, 13, 14, 15, 18, 22, 23, 24, 25, 27, 29, 35, 36, 38, 39, 45, and 46;

C.I. Basic Violet 1, 2, 3, 7, 10, 15, 16, 20, 21, 25, 27, 28, 35, 37, 39, 40, and 48;

C.I. Basic Yellow 1, 2, 4, 11, 13, 14, 15, 19, 21, 23, 24, 25, 28, 29, 32, 36, 39, and 40;

C.I. Basic Blue 1, 3, 5, 7, 9, 22, 26, 41, 45, 46, 47, 54, 57, 60, 62, 65, 66, 69, and 71; and C.I. Basic Black 8.

The amount of the dye added is determined depending upon the kind of the dye, the kind of the solvent component, properties required of the ink and the like. In general, however, it is preferably in the range of from 0.2 to 15% by weight, still preferably 0.5 to 10% by weight, based on the total weight of the ink.

Preferred examples of the organic solvent include high-boiling, low-volatile polyhydric alcohols, such as glycerin, ethylene glycol, diethylene glycol, triethylene glycol, propylene glycol, dipropylene glycol, hexylene glycol, polyethylene glycol, and polypropylene glycol. Further, water-soluble organic solvents, for example, nitrogen-containing organic solvents, such as N-methyl-2-pyrrolidone, 1,3-dimethyl imidazolidinone, monoethanolamine, N, N-dimethylethanolamine, N, N-diethylethanolamine, diethanolamine, N-n-butyldiethanolamine, triisopropanolamine, and triethanolamine may be added in such an amount as will not cause bleeding in the print. In particular, diethylene glycol and glycerin are preferred. Further, according to a preferred embodiment of the present invention, the ink composition preferably further comprises benzotriazole from the viewpoint of stabilizing the properties of the ink.

Preferred examples of the surfactant and penetrating agent include anionic surfactants, amphoteric surfactants, cationic surfactants, and nonionic surfactants. Examples of the anionic surfactant include alkylsulfocarboxylates, α-olefin sulfonates, polyoxyethylene alkyl ether acetates, N-acyl amino acid and salts thereof, N-acyl methyltaurine salts, alkylsulfate polyoxy alkyl ether sulfates, alkylsulfate polyoxyethylene alkyl ether phosphates, rosin soap, castor oil sulfate, lauryl alcohol sulfate, alkylphenol type phosphates, alkyl type phosphates, alkyl allyl sulfonates, diethylsulfosuccinate, diethylhexylsulfosuccinate, and dioctylsulfosuccinate. Examples of the cationic surf actant include 2-vinylpyridine derivatives and poly-4-vinylpyridine derivatives. Examples of the amphoteric surfactant include lauryl dimethyl aminoacetic acid betaine, 2-alkyl-N-carboxymethyl-N-hydroxyethyl imidazolinium betaine, coconut oil fatty acid amide propyldimethylaminoacetic acid betaine, polyoctyl polyaminoethyl glycine, and imidazoline derivatives. Examples of the nonionic surfactant include ether surf actants, such as polyoxyethylene nonyl phenyl ether, polyoxyethylene octyl phenyl ether, polyoxyethylene dodecyl phenyl ether, polyoxyethylene alkyl allyl ethers, polyoxyethylene oleyl ether, polyoxyethylene lauryl ether, polyoxyethylene alkyl ethers, polyoxyalkylene alkyl ethers; ester surfactants, such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycol surfactants, such as 2,4,7,9-tetramethyl-5-decyn-4,7-diol, 3,6-dimethyl-4-octyn-3,6-diol, and 3,5-dimethyl-1-hexyn-3-ol (for example, Surfynol 104, 82, 465, and TG, manufactured by Nissin Chemical Industry Co., Ltd.); fluorosurfactants, such as fluorine-substituted alkyl esters and perfluoroalkyl carboxylates (for example, Ftergent series manufactured by Neos Co., Ltd., Lodyne series manufactured by Ciba-Geigy, Zonyl series manufactured by Du Pont, Monflor series manufactured by ICI, Surfluon series manufactured by Asahi Glass Co., Ltd., Unidyne series manufactured by Daikin Industries, Ltd., and FC Series, manufactured by Sumitomo 3M Ltd.). The use of fluorosurfactants, particularly amphoteric or nonionic surfactants is preferred. The amount of the surfactant added may be suitably determined. For the fluorosurfactants, however, it is preferably about 1 to 10,000 ppm.

The recording medium having on its surface an ink-repellent layer used in the present invention refers to a recording medium having on its surface a layer having low affinity for the ink, i.e., a layer having low wettability by the ink, for example, a recording medium such as paper having on its surface an ink-repellent layer containing a water-soluble silicone compound and/or a water-soluble fluorine compound. These substances having low affinity for the ink, such as water-soluble silicone compounds and water-soluble fluorine compounds, may be supported onto the surface of a recording medium, such as paper, with the aid of a binder. If necessary, the layer may contain a white pigment based on silica.

Water-soluble silicone compounds include random, block, or graft copolymers of polyalkyl or polyallylsiloxane (for example, dimethylsiloxane or phenylsiloxane) with higher alcohols (for example, ethylene glycol, trimethylolpropane, pentaerythritol or sorbitol), these random, block, or graft copolymers being soluble in water. Further, a water-soluble copolymer of a siloxane compound with hydroxymethacrylic acid is also a preferred example of the water-soluble silicone compound. The silicone compound may be in the form of a silicone emulsion. Examples of the silicone emulsion include an emulsion prepared by stably dispersing silicone oil (polydimethylsiloxane having a siloxane skeleton (Si—O—Si)) in water and an emulsion prepared by emulsion polymerization of a dimethylsiloxane monomer. Some of the methyl groups in the molecule of the silicone compound may be substituted with an epoxy group, an amino group, a reactive hydrogen or the like.

Specific examples of the water-soluble fluorine compound include random, block, or graft copolymers of fluoroalkylpolysiloxanes with higher alcohols, which copolymers are soluble in water. The water-soluble fluorine compound may be in the form of a fluororesin emulsion. Examples of the fluororesin emulsion include an emulsion prepared by stably dispersing a fluorosilicone oil in water.

Specific examples of the binder include PVA, oxidized starch, etherified starch, other starch derivatives, gelatin, casein, carboxymethylcellulose, hydroxyethylcellulose, other cellulose derivatives, and polyvinyl pyrrolidone.

Preferred specific examples of the recording medium include those described in Japanese Patent Laid-Open No. 24908/1991.

Commercially available recording media may be used as the recording medium, and specific examples thereof include Epson Superfine special purpose paper.

The ink jet recording method according to the present invention is in common with the conventional ink jet recording method in that ink droplets are ejected onto a recording medium to form ink dots thereon. However, the ink jet recording method according to the present invention is different from the conventional ink jet recording method in that the above ink composition and recording medium are used. According to a preferred embodiment of the present application, the amount of ink per dot is preferably in the range of 5 to 65 ng per dot, more preferably 30 to 50 ng per dot.

According to the ink jet recording method of the present invention, it is possible to provide an ink dot having very excellent circularity. This in turn can offer a very clear, that is, sharp, image. While there is no intention of being bound by the following theory, the reason why the ink dot having high circularity and the sharp image can be provided will be described with reference to FIG. 1. FIG. 1A is a diagram

EXAMPLE

The present invention will now be described in more detail with reference to the following examples, though it is not limited to these examples only.

Preparation of Ink Compositions

Ink compositions of Examples 1 to 7 and Comparative Examples 1 to 3 listed in Table 1 were prepared by mixing ingredients specified in Table 1 and heating and stirring the mixture.

TABLE 1

|  | Example | | | | | | | Comparative Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| C.I. Direct Black 154 | 4 |   |   |   |   |   | 2 | 4 |   |   |   |
| C.I. Direct Yellow 86 |   | 3 |   |   |   |   |   |   | 3 |   |   |
| C.I. Acid Red 52 |   |   | 2 |   |   |   |   |   |   | 2 |   |
| C.I. Direct Blue 199 |   |   |   | 2 |   | 1 |   |   |   |   |   |
| C.I. Eye Shadow Blue 9 |   |   |   |   | 1 | 2 |   |   |   |   | 4 |
| TEG-mBE | 9 | 9 |   |   |   |   |   | 20 | 15 |   | 10 |
| DEG-mBE |   | 10 |   |   |   | 10 |   |   | 15 | 5 | 10 |
| Surfynol 465 | 1 | 1 | 1.5 | 2 | 1.5 | 2 | 1 |   |   |   |   |
| Diethylene glycol | 10 | 10 | 3.5 |   | 5 | 7 |   | 20 | 10 | 20 | 22 |
| Glycerin |   | 6 | 5 | 4 | 3.5 | 7 | 9 |   | 10 | 13 | 10 |
| Proxel XL-2 | 0.3 | 0.4 | 0.1 | 0.1 | 0.2 | 0.5 | 0.1 | 0.3 | 0.4 | 0.1 | 0.5 |
| Ethanol |   |   |   |   | 4 | 3 | 6 |   |   |   | 5 |
| Ultrapure water | 75.7 | 60.6 | 87.9 | 91.9 | 84.8 | 67.5 | 81.9 | 55.7 | 46.6 | 59.9 | 38.5 |
| Angle of contact(°) | 0 | 0 | 0 | 0 | 0 | 0 | 0 | 4 | 6 | 12 | 2 |

In the table, compositions are in wt %.

showing the formation of an ink dot by the recording method of the present invention. An ink droplet 1 ejected through a recording head nozzle (not shown) is deposited on an ink-repellent layer 3 provided on the surface of a recording medium 2. By virtue of the ink repellency of the layer 3, the ink droplet 1 is absorbed without being significantly spread on the recording medium 2 and reaches a substrate 4 such as paper. Therefore, the resultant ink dot 12 has a first portion 5 in the ink-repellant layer 3 with a relatively small dot diameter. The first portion 5 extends from a surface 14 of the ink-repellant layer 3 to an interface 16 between the ink-repellant layer and the substrate 4. The ink dot 12 has a second portion 10 that extends from the interface 16 to an interior portion 18 of the substrate 4. The first portion 5 has a diameter that is substantially the same at the surface 14 and at the interface 16. The second portion 10 has a diameter that is greater at the interior portion 18 than at the interface 16. When the contact angle of the ink composition is not in the above range, problems often occur such as lowered-circularity of the dot and relatively increased ink dot diameter. On the other hand, FIG. 1B shows a diagram showing the formation of an ink dot on a conventional recording medium not having any ink-repellent layer. In this case, an ink droplet 1, upon ejection onto a recording medium 6, forms an ink dot 7 having a larger size than the ink droplet 1. This is attributable to the fact that this recording medium is wettable by the ink composition, that is, penetrable by an ink.

Preparation of Recording Paper

A 10% aqueous PVA solution (20 parts) was added to 100 parts of a synthetic silica as a pigment, and 1% by weight of a silicone oil emulsion (polydimethylsiloxane) or a silicone/ethylene glycol copolymer was added to the aqueous solution to prepare a coating composition. The coating composition was coated on wood-free paper having a basis weight of 60 g/m² by means of a wire bar to prepare a recording medium. The amount of the coating was 10 g/m².

Printing Test 1

The ink compositions of Examples 1 to 7 and Comparative Examples 1 to 4 were used to carry out printing with an ink jet printer MJ-500 (manufactured by Seiko Epson Corporation). The recording paper, prepared above, with a silicone oil emulsion (polydimethylsiloxane) and a silicone/ethylene glycol copolymer supported thereon and wood-free paper with no coating composition applied thereon were used as the recording paper. The circularity of the dots thus formed was determined according to the following equation.

$$Circularity = 4\pi S/(L^2)$$

wherein S represents the area of the dot and L represents the perimeter of the dot.

The circularity was evaluated based on the following criteria:

Not more than 1.0 to not less than 0.9: excellent (○)
Less than 0.9 to not less than 0.8: somewhat poor (Δ)
Less than 0.8: failure (X)

The results were as given in Table 2.

TABLE 2

| Ink | Recording Paper | | |
|---|---|---|---|
| Composition | A | B | C (Control) |
| Example 1 | ○ | ○ | Δ |
| Example 2 | ○ | ○ | ○ |
| Example 3 | ○ | ○ | x |
| Example 4 | ○ | ○ | x |
| Example 5 | ○ | ○ | x |
| Example 6 | ○ | ○ | x |
| Example 7 | ○ | ○ | x |
| Comparative Example 1 | x | x | x |
| Comparative Example 2 | x | x | x |
| Comparative Example 3 | x | x | x |
| Comparative Example 4 | x | x | x |

In the table, recording paper A is a recording medium with a silicone oil emulsion (polydimethylsiloxane) supported thereon, recording paper B is a recording medium with a silicone/ethylene glycol copolymer supported thereon, and recording paper C is wood-free paper.

Printing Test 2

The ink compositions of Examples 1 to 7 and Comparative Examples 1 to 4 were used to form Japan Standard Association SCID patterns by means of the same printer as used in the printing test 1.

The sharpness of the images thus obtained was observed with the naked eye and evaluated based on the following criteria:

Very sharp image: excellent (○)

Somewhat lack of sharpness: somewhat poor (Δ)

Lack of sharpness: failure (X)

The results were as given in Table 3.

TABLE 3

| Ink | Recording Paper | | |
|---|---|---|---|
| Composition | A | B | C (Control) |
| Example 1 | ○ | ○ | x |
| Example 2 | ○ | ○ | x |
| Example 3 | ○ | ○ | x |
| Example 4 | ○ | ○ | x |
| Example 5 | ○ | ○ | x |
| Example 6 | ○ | ○ | x |
| Example 7 | ○ | ○ | x |
| Comparative Example 1 | x | x | x |
| Comparative Example 2 | x | x | x |
| Comparative Example 3 | x | x | x |
| Comparative Example 4 | x | x | x |

What is claimed is:

1. An ink jet recording method comprising the steps of:
   (a) providing a recording medium having an ink-repellent layer comprising a water-soluble silicone compound, a water-soluble fluorine compound or both;
   (b) providing an ink composition having components comprising a colorant, an acetylene glycol surfactant and water, said components being present in the ink composition in respective amounts such that the ink composition has a contact angle with a sized recording paper of 0°, as measured one second after an initiation of contact of the ink composition with the sized recording paper, said ink composition containing not less than 60% by weight of water; and
   (c) ejecting ink droplets of the ink composition onto the recording medium to form an ink image on the recording medium.

2. The ink jet recording method according to claim 1, wherein the ink composition comprises, an organic solvent.

3. The ink jet recording method according to claim 1, wherein the water-soluble silicone compound is a polymer of polyalkyl or polyallylsiloxane with a higher alcohol.

4. The ink jet recording method according to claim 1, wherein the water-soluble silicone compound is a polymer of a siloxane compound with hydroxymethacrylic acid.

5. The ink jet recording method according to claim 1, wherein the water-soluble fluorine compound is a copolymer of fluoroalkylpolysiloxane with higher alcohols.

6. A recording medium recorded by the method according to claim 1.

7. The ink jet recording method according to claim 1, wherein the recording medium further comprises a substrate, said ink composition, when ejected onto the recording medium, forming an ink dot having a first portion in the ink-repellant layer and a second portion in the substrate, said first portion extending from a surface of the ink repellant layer to an interface between the ink-repellant layer and the substrate and having a diameter that is of high circularity and that is substantially the same at the surface and at the interface.

8. The ink jet recording method according to claims 7, wherein the substrate comprises paper, and wherein said second portion extends from the interface to an interior portion of the substrate, said second portion having a diameter that is greater at said interior portion that at the interface.

9. An inkjet recording method as claimed in claim 1, wherein the recording medium and ink composition are provided such that the ink image is formed of a plurality of dots with each dot having a circularity of at least 0.9 as determined by the formula:

$$\text{circularity} = 4\pi S/(L^2)$$

wherein S represents the area of the dot and L represents the perimeter of the dot.

10. A recording composition comprising
   a) a recording medium having (i) an ink-repellant layer comprising a water-soluble silicone compound, a water-soluble fluorine compound or both, and (ii) a substrate; and
   b) an ink composition having components comprising a colorant, an acetylene glycol surfactant and water, said components being present in the ink composition in respective amounts such that the ink composition has a contact angle with a sized recording paper of 0°, as measured one sec after the initiation of contact of the ink composition with the sized recording paper, said ink composition containing not less than 60% by weight of water, said ink composition being present in the recording medium as an ink dot having a first portion in the ink-repellant layer and a second portion in the substrate, said first portion extending from a surface of the ink-repellant layer to an interface between the ink-repellant layer and the substrate and having a diameter that is of high circularity and that is substantially the same at the surface and at the interface, said second portion extending from the interface to an interior portion of the substrate, said second portion having a diameter that is greater at said interior portion than at the interface.

11. A recording composition as claimed in claim 10, wherein the ink composition is present in an amount of about 5–65 ng in the ink dot.

12. A recording composition as claimed in claim 10, wherein the recording medium further comprises a binder that binds said ink-repellant layer to said substrate.

13. A recording composition as claimed in claim 12, wherein the recording composition consists essentially of said ink composition, said recording medium and said binder.

14. The recording composition according to claim 10, wherein the ink composition comprises, an organic solvent.

15. The recording composition according to claim 14, wherein the ink composition further comprises a surfactant or penetrating agent.

16. The recording composition according to claim 10, wherein the ink-repellant layer comprises the water-soluble silicone compound, said water-soluble silicone compound being a polymer of polyalkyl or polyallylsiloxane with a higher alcohol.

17. The recording composition according to claim 10, wherein the ink-repellant layer comprises the water-soluble silicone compound, the water-soluble silicone compound being a polymer of a siloxane compound with hydroxymethacrylic acid.

18. The recording composition according to claim 10, wherein the ink-repellant layer comprises the water-soluble fluorine compound, the water-soluble fluorine compound being a copolymer of fluoroalkylpolysiloxane with higher alcohols.

19. A recording composition as claimed in claim 10, wherein the first portion of the ink dot has a circularity of at least 0.9 as determined by the formula:

$$\text{circularity} = 4\pi S/(L^2)$$

wherein S represents the area of the dot and L represents the perimeter of the dot.

20. An ink jet recording kit comprising a) a recording medium having (i) an ink-repellant layer comprising a water-soluble silicone compound, a water-soluble fluorine compound or both, and (ii) a substrate; and b) an ink composition having components comprising a colorant, an acetylene glycol surfactant and water, said components being present in the ink composition in respective amounts such that the ink composition has a contact angle with a sized recording paper of 0°, as measured one sec after the initiation of contact of the ink composition with the sized recording paper, said ink composition containing not less than 60% by weight of water, said ink composition, when ejected onto the recording medium, forming an ink dot having a first portion in the ink-repellant layer and a second portion in the substrate, said first portion extending from a surface of the ink-repellant layer to an interface between the ink-repellant layer and the substrate and having a diameter that is of high circularity and that is substantially the same at the surface and at the interface, said second portion extending from the interface to an interior portion of the substrate, said second portion having a diameter that is greater at said interior portion than at the interface.

21. An ink jet as claimed in claim 20, wherein the recording medium an the ink composition are selected such that the first portion of the ink dot formed when the ink composition is ejected onto the recording medium, has a circularity of at least 0.9 as determined by the formula:

$$\text{circularity} = 4\pi S/(L^2)$$

wherein S represents the area of the dot and L represents the perimeter of the dot.

* * * * *